(12) United States Patent
Liu et al.

(10) Patent No.: US 7,810,489 B2
(45) Date of Patent: Oct. 12, 2010

(54) SOLAR AIR CONDITIONER

(75) Inventors: Tay-Jian Liu, Taipei Hsien (TW); Xin-Jian Xiao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 366 days.

(21) Appl. No.: 11/964,796

(22) Filed: Dec. 27, 2007

(65) Prior Publication Data
US 2009/0113909 A1    May 7, 2009

(30) Foreign Application Priority Data
Nov. 2, 2007    (CN) .................. 2007 1 0124253

(51) Int. Cl.
*E04D 13/18* (2006.01)
*F24J 3/02* (2006.01)
(52) U.S. Cl. .................. 126/569; 126/664; 126/669; 126/445; 126/429; 126/666; 60/200 A; 52/173.3
(58) Field of Classification Search .............. 126/569, 126/664, 666, 669, 640; 52/173.3; 60/200 A
See application file for complete search history.

(56) References Cited

U.S. PATENT DOCUMENTS

| 4,222,373 | A | * | 9/1980 | Davis | 126/664 |
| 4,316,452 | A | * | 2/1982 | Levine | 126/664 |
| 4,607,616 | A | * | 8/1986 | Lehmann | 126/669 |
| 6,672,018 | B2 | * | 1/2004 | Shingleton | 52/173.3 |
| 6,880,553 | B2 | * | 4/2005 | Liu et al. | 126/628 |

* cited by examiner

*Primary Examiner*—Steven B McAllister
*Assistant Examiner*—Nikhil Mashruwala
(74) *Attorney, Agent, or Firm*—Jeffrey T. Knapp

(57) ABSTRACT

A solar air conditioner includes an inlet assembly (20), an outlet assembly (30), a solar collector assembly (10), and a plurality of connecting assemblies (14) connecting the solar collectors, and the inlet and the outlet assemblies together. The solar collector assembly includes a plurality of solar collectors (12). Each of the solar collectors has a bottom plate (124), a heat-absorbing unit (123) mounted on the bottom plate, and a transparent panel (121) positioned on the heat-absorbing unit. The heat-absorbing unit divides an inner space of the solar collector into an upper heat-storage cavity (125) and a lower heat-absorbing cavity (125). The inlet and outlet assemblies seal two ends of the upper heat-storage cavity and communicate with two ends of the lower heat-absorbing cavity.

9 Claims, 15 Drawing Sheets

SOLAR AIR CONDITIONER

CROSS-REFERENCES TO RELATED APPLICATIONS

This application is related to co-pending U.S. patent application Ser. No. 11/776,906 filed on Jul. 26, 2007 and entitled "SOLAR AIR CONDITIONER"; and co-pending U.S. patent application entitled "SOLAR AIR CONDITIONING APPARATUS" and filed in the same day as the instant application. The co-pending U.S. patent applications are assigned to the same assignee as the instant application. The disclosures of the above-identified applications are incorporated herein by reference.

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air pre-heater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.
(2) Solar-thermo conversion efficiency may be limited.
(3) The structure of the related solar collector is complicated, which makes its installation and maintenance difficult. And thus prolongs the return period.
(4) The related solar heating device has poor compatibility and flexibility to match different bearing structures. Very often, it has to be custom-made.
(5) The contour of the solar collector is obtrusive and often impairs the aesthete and harmony of the overall appearance of the bearing structure.
(6) The packaging needed for the collector takes up much space and increases the cost of storage, display, and marketing.
(7) The integral assembly of the whole-unit product is bulky, making it difficult to use in large-area application and increases installation cost.
(8) Glass or transparent panels are glazed onto the outer frame of a heat-insulated chamber. Different thermal expansion coefficients of materials may cause thermal stress problems.
(9) The related design is so complicated as to be difficult for an untrained user to install.
(10) Some of the related designs can only be applicable to the structures which are under construction and designed to allow its installation. For most existing structures, the designs are unsuitable.
(11) When air passes over a glazed panel, heat is dissipated unless double-glazing is used, but it is expensive and troublesome.
(12) Hot water supply systems or liquid systems operated by solar heating experience problems due to freezing and leakage of the working liquid.

Related solar air conditioners include that disclosed in U.S. Pat. No. 6,880,553. Heat-absorbing units of the solar air conditioner of U.S. Pat. No. 6,880,553 are connected in a fixed way, however it is difficult to extend the area of the solar air conditioner in a convenient way so that the solar air conditioner can be used in different applications.

It is therefore desirable to provide a solar air conditioner that can be flexibly extended and used in different applications.

SUMMARY OF THE INVENTION

The present invention relates to a solar air conditioner. The solar air conditioner includes an inlet assembly, an outlet assembly, a solar collector assembly, and a plurality of connecting assemblies connecting the solar collectors, and the inlet and the outlet assemblies together. The solar collector assembly includes a plurality of solar collectors. Each of the solar collectors has a bottom plate, a heat-absorbing unit mounted on the bottom plate, and a transparent panel positioned on the heat-absorbing unit. The heat-absorbing unit divides an inner space of the solar collector into an upper heat-storage cavity and a lower heat-absorbing cavity. The inlet and outlet assemblies seal two ends of the upper heat-storage cavity and communicate with two ends of the lower heat-absorbing cavity.

Other advantages and novel features of the present invention will become more apparent from the following detailed description of preferred embodiment when taken in conjunction with the accompanying drawings.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
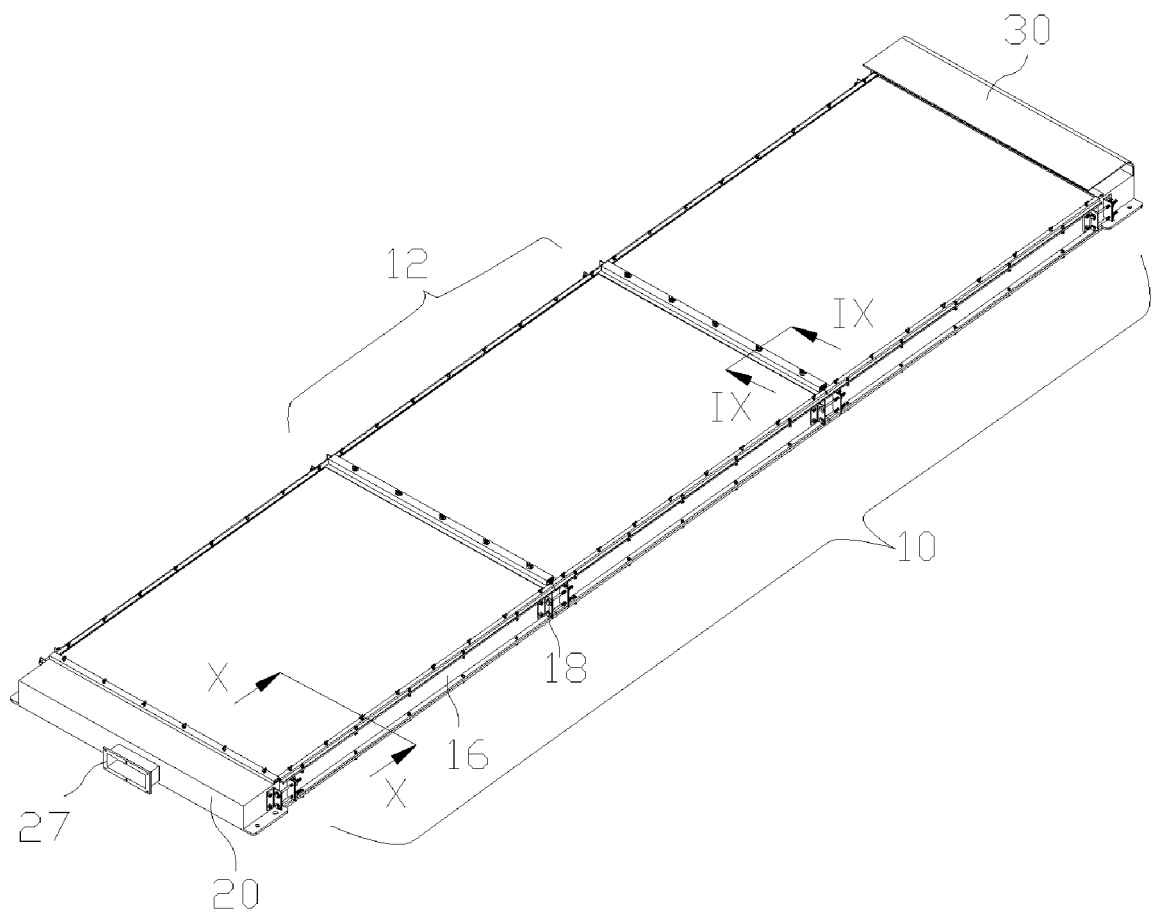
FIG. 1 is an assembled, schematic view of a solar air conditioner in accordance with a preferred embodiment of the present invention.
Figure 2:
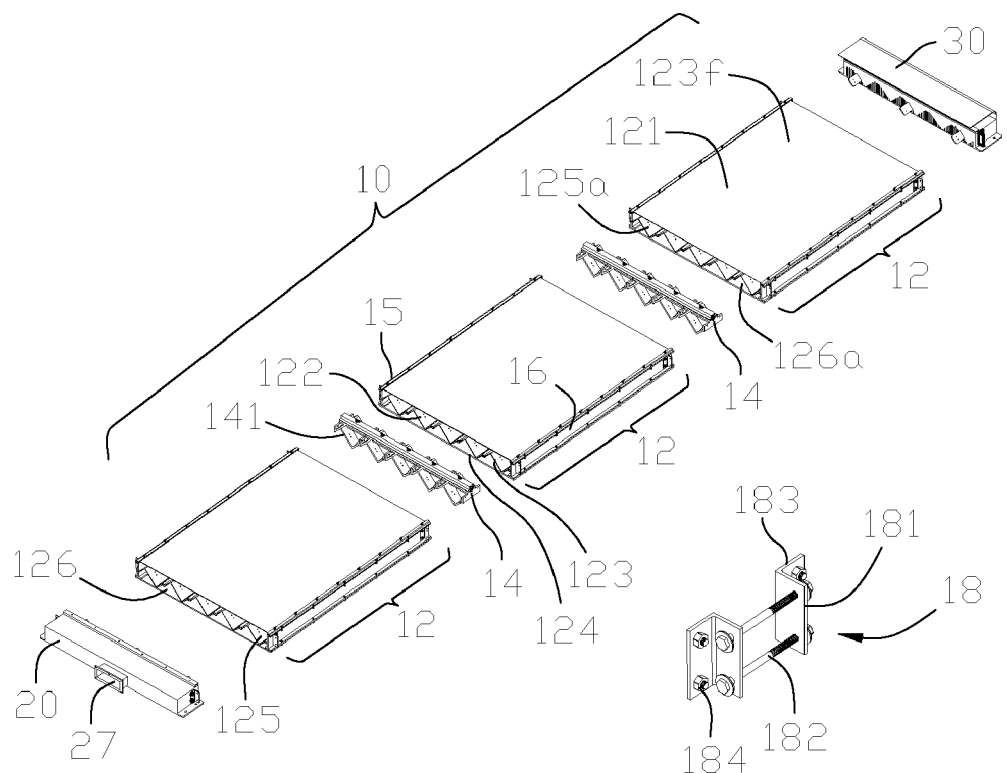
FIG. 2 is an exploded, schematic view of the solar air conditioner in FIG. 1.

Referring to FIGS. 1 and 2, a solar air conditioner in accordance with a preferred embodiment of the present invention is shown. The air conditioning device includes a solar collector assembly 10, and inlet and outlet assemblies 20, 30 respectively connected with entrance and exit of the solar collector assembly 10. The inlet and outlet assemblies 20, 30 respectively communicate with an air-exhausting pipe (not shown) and outdoor environments, in such that stale indoor air is exhausted outside a house (not shown) and fresh outdoor air is induced inside the house.

The solar collector assembly 10 includes a series of solar collectors 12. The solar collectors 12 are assembled together via a plurality of connecting assemblies 14 disposed therebetween. Each of the solar collectors 12 has first and second supporting members 15, 16 arranged at left and right sides thereof. Connections between the solar collectors 12 are strengthened via a plurality of fixing assemblies 18. The fixing assembly 18 has two fixing elements 181 which are united together via a pair of bolts 182. Each of the fixing elements 181 has an ear 183 defining a pair of through holes (not shown) therein. Screws 184 extend through the through holes of the fixing assembly 18 and through holes 152a (shown in FIG. 3) of adjacent first supporting members 15 or through holes 152a of adjacent second supporting members 16, joining the adjacent first supporting members 15 or the adjacent second supporting members 16 together. Connections between the solar collector assembly 10 and the inlet and outlet assemblies 20, 30 are also strengthened via the fixing assemblies 18.

Figure 3:
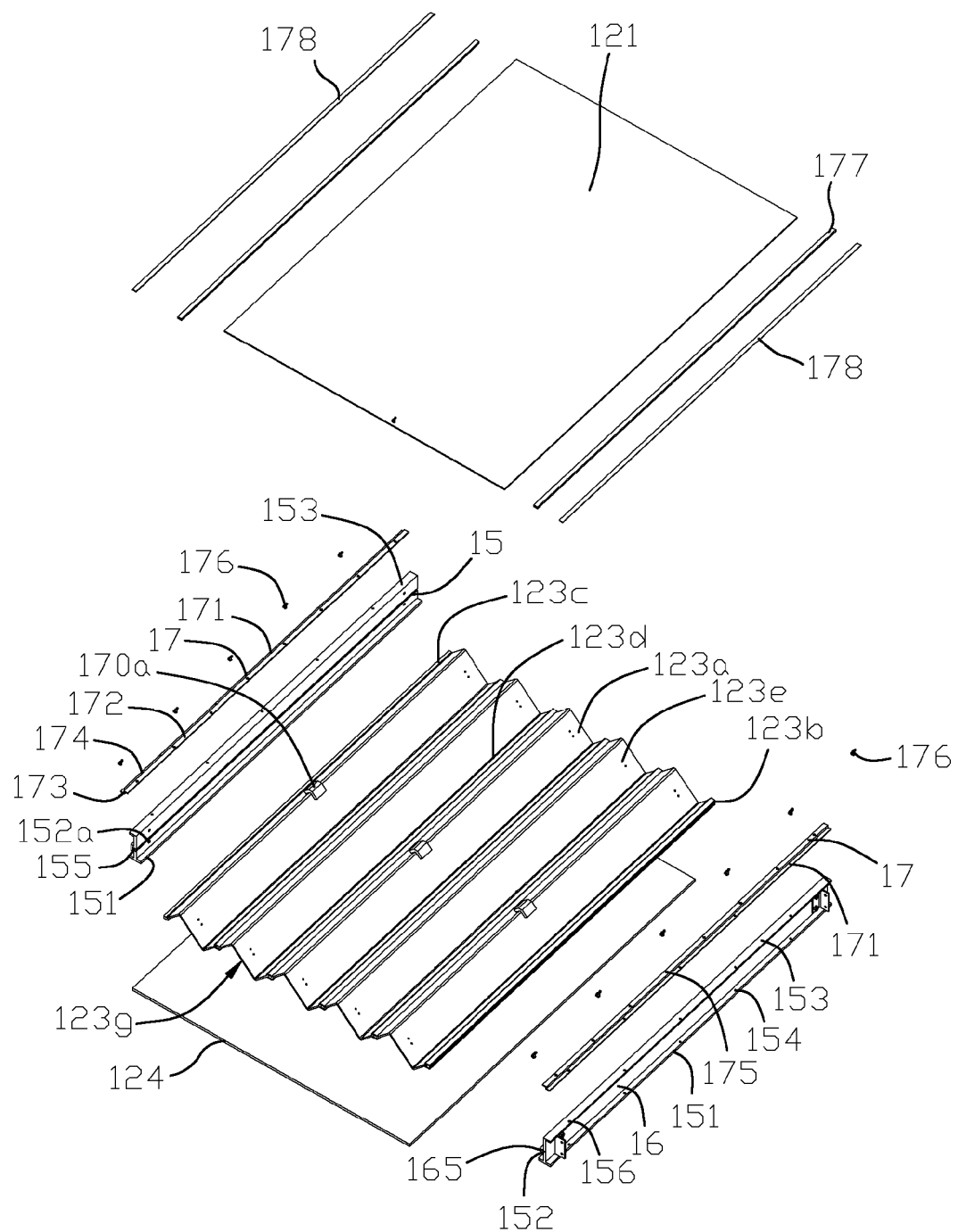
FIG. 3 is a schematic view of a solar collector of the solar air conditioner in FIG. 1.

Referring to FIGS. 2 and 3, each of the solar collectors 12 includes a transparent panel 121 and a heat-absorbing set 122 located below the transparent panel 121. The heat-absorbing set 122 is used for absorbing solar energy to heat air flowing therethrough. The heat-absorbing set 122 includes a modularized serpentine heat-absorbing unit 123 and a bottom plate 124 mounted the heat-absorbing unit 123 thereon. The heat-absorbing unit 123 is made of good thermal conductivity materials with black surface.

The heat-absorbing unit 123 separates an inner space defined in the solar collector 12 into an upper heat-storage cavity 125 and a lower heat-absorbing cavity 126. A plurality of V-shaped heat-storage channels 125a are defined in the heat-storage cavity 125, and a plurality of V-shaped heat-absorbing channels 126a are defined in the heat-absorbing cavity 126. When the inlet and outlet assemblies 20, 30 are assembled to the solar collector assembly 10, the heat-storage channels 125a are hermetically sealed and the heat-absorbing channels 126a communicate with the inlet and outlet assemblies 20, 30. An energy receiving surface 123f covering the heat-storage channels 125a is formed on the transparent panel 121, and a heat-absorbing surface 123g corresponding to the heat-absorbing cavity 126 is formed on the heat-absorbing unit 123.

Figure 4A:
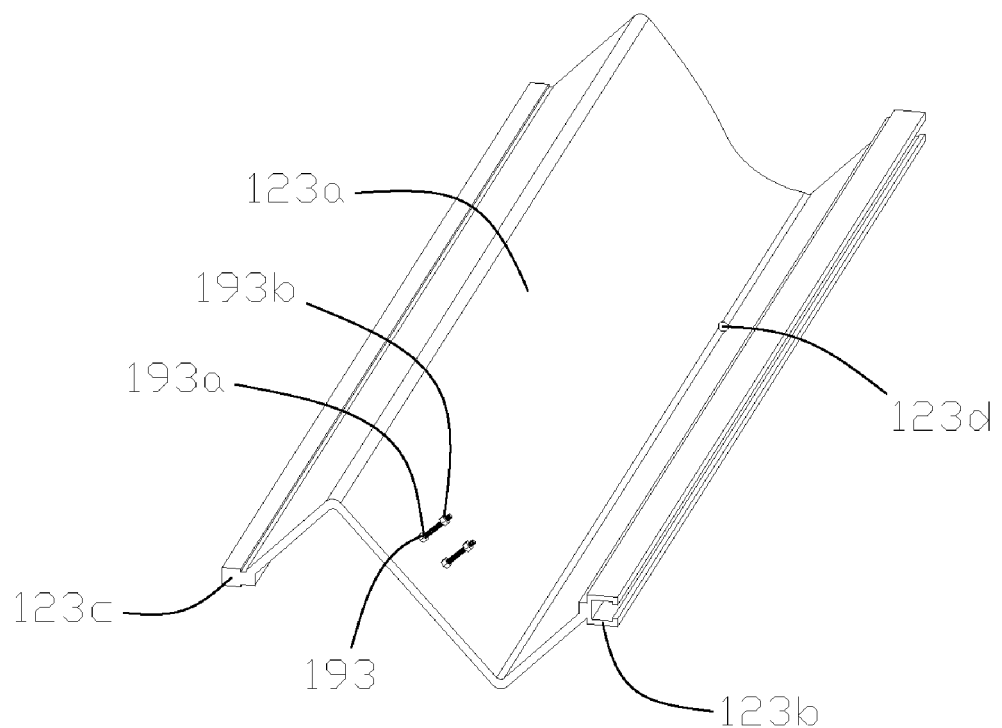
FIG. 4A is a schematic view of a heat-absorbing plate of a heat-absorbing unit of the solar collector in FIG. 3.
Figure 4B:
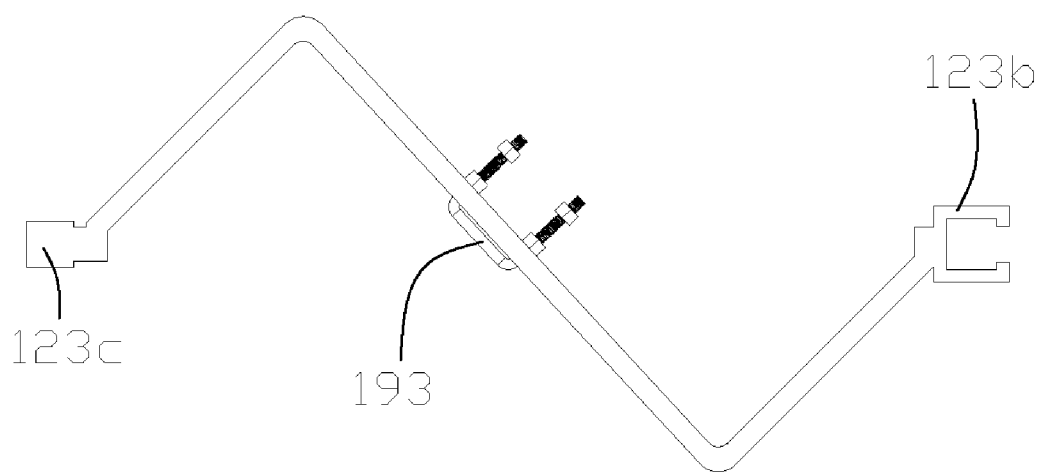
FIG. 4B is a front view of FIG. 4.

Referring to FIGS. 3 and 4, the heat-absorbing unit 123 includes a plurality of S-shaped (wave shaped) heat-absorbing plates 123a clasped with each other in a latitudinal direction. First and second clasping structures 123b, 123c are formed at right and left ends of the heat-absorbing plate 123a. The first and second clasping structures 123b, 123c of the heat-absorbing plate 123a have configurations which complement with each other. The first clasping structure 123b is a substantially C-shaped cutout, whilst the second clasping structure 123c is a clasping protrusion fitted in the cutout. Adjacent left and right heat-absorbing plates 123a are united together via engagement between the first clasping structure 123b of the left heat-absorbing plate 123a and the second clasping structure 123c of the right heat-absorbing plate 123a. The heat-absorbing plates 123a of the heat-absorbing unit 123 are assembled together in such manner. The heat-absorbing plate 123a of the heat-absorbing unit 123 defines a plurality of mounting holes 123d at a trough thereof, for mounting the heat-absorbing plate 123a onto the bottom plate 124 of the heat-absorbing set 122. The assembly of the heat-absorbing unit 123 is thin and handy for displaying, packaging, storage, transportation and assembly. Front and rear ends of the heat-absorbing plate 123a respectively define a pair of fixing holes 123e therein, for connecting the front and rear ends of the heat-absorbing plate 123a with corresponding front and rear connecting assemblies 14.

Referring to FIG. 3, the first and second supporting members 15, 16 each includes an elongate bottom base 151, a supporting plate 152 perpendicular and upwardly extending from a middle portion of the bottom base 151, and a supporting base 153 perpendicularly and outwardly extending from a top end of the supporting plate 152. The bottom bases 151 of the first and second supporting members 15, 16 define a plurality of mounting holes 154 in an outer side thereof, for mounting the solar collector 12 onto a rooftop or a wall of the house, or an additional fixing board (not shown). Front and rear ends of the supporting plates 152 of the first and second supporting members 15, 16 respectively define the through holes (not shown) therein, corresponding to the through holes of the fixing assemblies 18.

The supporting plates 152 of the first and second supporting members 15, 16 respectively have first and second clasping structures extending along a longitudinal direction thereof. That is, the first supporting member 15 defines an elongate cutout 155 therein and the second supporting member 16 extends a clasping protrusion 165 therefrom. The clasping protrusion of an adjacent heat-absorbing plate 123a is engagingly received in the elongate cutout 155 of the first supporting plate 152, and the adjacent heat-absorbing plate 123a is thereby connected to the first supporting member 15. The clasping protrusion 165 of the second supporting plate 152 is engagingly received in the elongate cutout of an adjacent heat-absorbing plate 123a, and the adjacent heat-absorbing plate 123a is thereby connected to the second supporting member 16.

Figure 10:
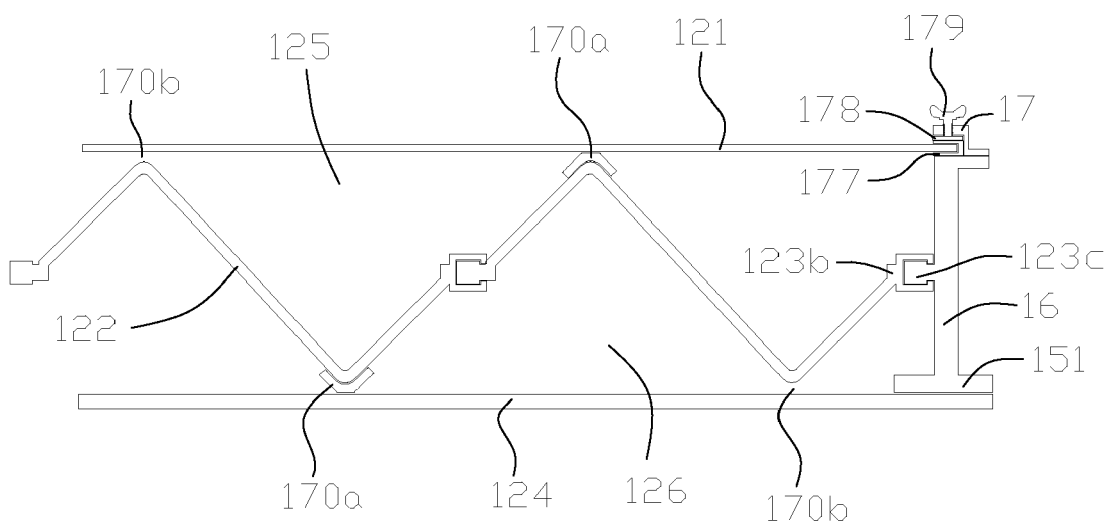
FIG. 10 is a schematic view of the solar air conditioner in FIG. 1, taken along line X-X.

The supporting bases 153 of the first and second supporting members 15, 16 respectively define a plurality of the mounting holes 156, corresponding to mounting holes 171 of a pair of supporting elements 17. Each of the supporting elements 17 includes a planar upper plate 172, a perpendicular plate 173 extending downwardly from the upper plate 172, and a lower plate 174 horizontally and outwardly extending from the perpendicular plate 173. The mounting holes 171 are defined in the lower plate 174 and a plurality of fixing holes 175 are defined in the upper plate 172. A plurality of bolts 176 extend through the mounting holes 171 of the lower plates 174 of the supporting elements 17 and the mounting holes 156 of the supporting bases 153 of the first and second supporting members 15, 16, mounting the supporting elements 17 onto the first and second supporting members 15, 16. Referring to FIG. 10, after the supporting elements 17 are mounted to the first and second supporting members 15, 16, two longitudinal slots are formed between the upper plates 172 of the supporting elements 17 and the supporting bases 153 of the first and second supporting members 15, 16. The transparent panel 121 with two U-shaped cushions 177 attached to left and right sides thereof is inserted into the longitudinal slots. A pair of press bars 178 are inserted into the longitudinal slots and sandwiched between the upper plates 172 of the supporting elements 17 and the transparent panel 121. A plurality of bolts 179 are threaded into the upper plates 172 of the supporting elements 17 and urge the press bars 178 to move downwardly and have intimate contacts with the U-shaped cushions 177. The U-shaped cushions 177 are therefore intimately sandwiched between the upper plates 172 of the supporting elements 17 and the transparent panel 121, hermetically sealing the left and right sides of the solar collector 12.

Referring to FIG. 3 and FIG. 10, a plurality of soft cushions 170a are distributed on crests of the heat-absorbing plates 123a and between the heat-absorbing plates 123a and the transparent panel 121. The soft cushions 170a are discretely distributed along longitudinal directions of the heat-absorbing plates 123a, for evenly supporting the transparent panel 121 on the heat-absorbing unit 123. A plurality of air gaps 170b are formed between the heat-absorbing unit 123 and the transparent panel 121 at positions without the soft cushions 170a. The air gaps 170b communicate the heat-storage channels 125a with each other in such that air in the heat-storage cavity 125 is evenly heated and the heat transfer capability of the solar air conditioner is increased. Similarly, there are a plurality of soft cushions 170a discretely distributed on the troughs of the heat-absorbing plates 123a and between the heat-absorbing plates 123a and the bottom plate 124. The soft cushions 170a are discretely distributed along longitudinal directions of the heat-absorbing plates 123a, evenly supporting the heat-absorbing plates 123a on the bottom plate 124. A plurality of air gaps 170b are also formed between the heat-absorbing plates 123a and the bottom plate 124 at positions without the soft cushions 170a. The air gaps 170b communicate the heat-absorbing channels 126a with each other in such that air in the heat-absorbing cavity 126 is evenly heated and the heat transfer capability of the solar air conditioner is further increased.

Referring to FIGS. 5 through 8, the connecting assembly 14 includes a plurality of connecting units 141 and a fixing member 142 covering the connecting units 141. Each of the connecting units 141 includes a zigzag base 143, two joining plates 144 perpendicularly and upwardly extending from left and right ends of the zigzag base 143, a supporting bridge 145 spanning above the zigzag base 143 and the joining plates 144, and two supporting arms 146 horizontally and outwardly extending from a bottom end of the supporting bridge 145. The zigzag base 143 has a configuration which matches with the configuration of the heat-absorbing plate 123a. A step-shaped indent 147 is formed at a bottom surface of the connecting unit 141 and between the zigzag base 143 and the right joining plate 144. The step-shaped indent 147 has a configuration which matches with a top surface of the first clasping structure 123b, so that the bottom surface of the connecting unit 141 can hermetically contact with a top surface of the heat-absorbing plate 123a. An elongate groove 148 is defined in and extends along a longitudinal direction of the supporting bridge 145. A transverse section of the elongate groove 148 is inverted T-shaped. A width of a top portion of the elongate groove 148 is smaller than a width of a bottom portion thereof in such that a plurality of inverted T-shaped joining elements such as inverted T-shaped bolts 191 received in the elongate groove 148 can not disassemble from the supporting bridge 145. A round through slot 149 is defined in the supporting bridge 145 and located below the elongate groove 148.

In assembly of the solar collector assembly 10, the connecting units 141 are assembled together via bolts 192 extending through mounting holes 144a defined in the joining plates 144 thereof. The assembled connecting units 141 are placed on the heat-absorbing plates 123a of the adjacent front and rear solar collectors 12, with the bottom surfaces of the connecting units 141 contacting with the top surfaces of the heat-absorbing plates 123a of the adjacent solar collectors 12. Meanwhile, a plurality of U-shaped bolts 193 extend through rear fixing holes 123e of the front solar collectors 12, the front fixing holes 123e of the rear solar collectors 12, and front and rear fixing holes 141a of the connecting units 141. A plurality of first screws caps 193a are received in counter-bores 141b defined in bottom surfaces of the connecting units 141. A plurality of second crew caps 193b are then screwed on the U-shaped bolts 193 so that the front and rear solar collectors 12 are assembled together via the connecting units 141.

Figure 7:
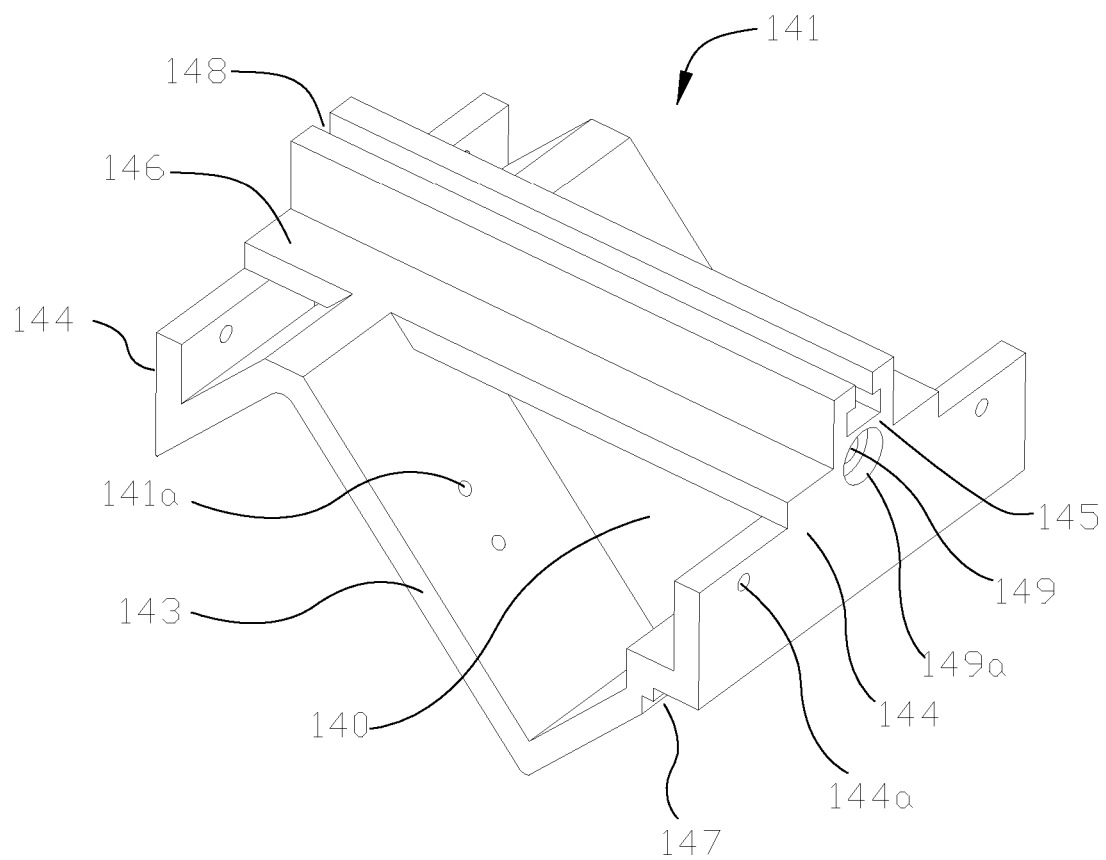
FIG. 7 is a schematic view of a connecting unit of the connecting assembly in FIG. 5.
Figure 8:
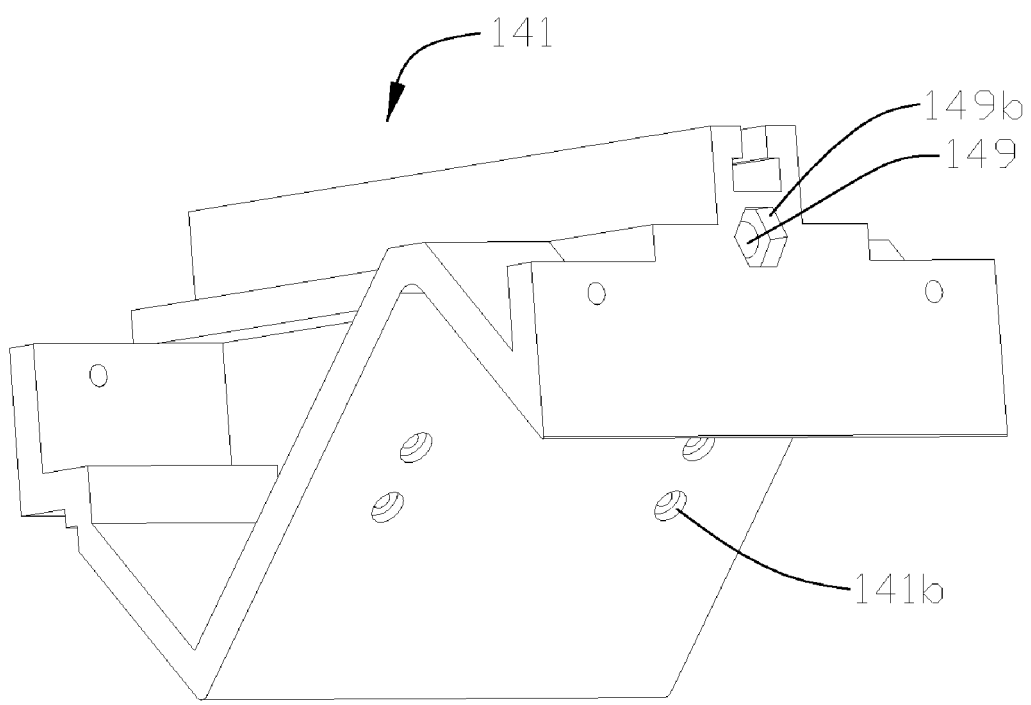
FIG. 8 is similar to FIG. 7, but viewed from another aspect.

Referring to FIGS. 7 and 8, connections between the solar collectors 12 and the connecting units 141 of the solar collector assembly 10 are strengthened via an elongate bolt 194 extending through the through slots 149 of the connecting units 141. The elongate bolt 194 has a hexagonal fixing cap 194a at one end and threads 194b at the other end. After the elongate bolt 194 extend through the through slots 149 of the connecting units 141, a screw cap 194c is threaded to the other end of the elongate bolt 194 so that the screw cap 194c and the fixing cap 194a respectively abut against opposite right and left surfaces of the connecting units 141. The connections between the solar collectors 12 and the connecting units 141 of the solar collector assembly 10 are therefore strengthened. In order to prevent the screw cap 194c and the fixing cap 194a from exposing out of the opposite surfaces of the connecting units 141, the through slot 149 has a hexagonal counter-bore 149b at one end for receiving the fixing cap 194a, and a round counter-bore 149a at the other end for receiving the screw cap 194c. The engagement between the fixing cap 194a and the hexagonal counter-bore 149b prevents the elongate bolt 194 from rotating in the through slot 149.

Figure 5:
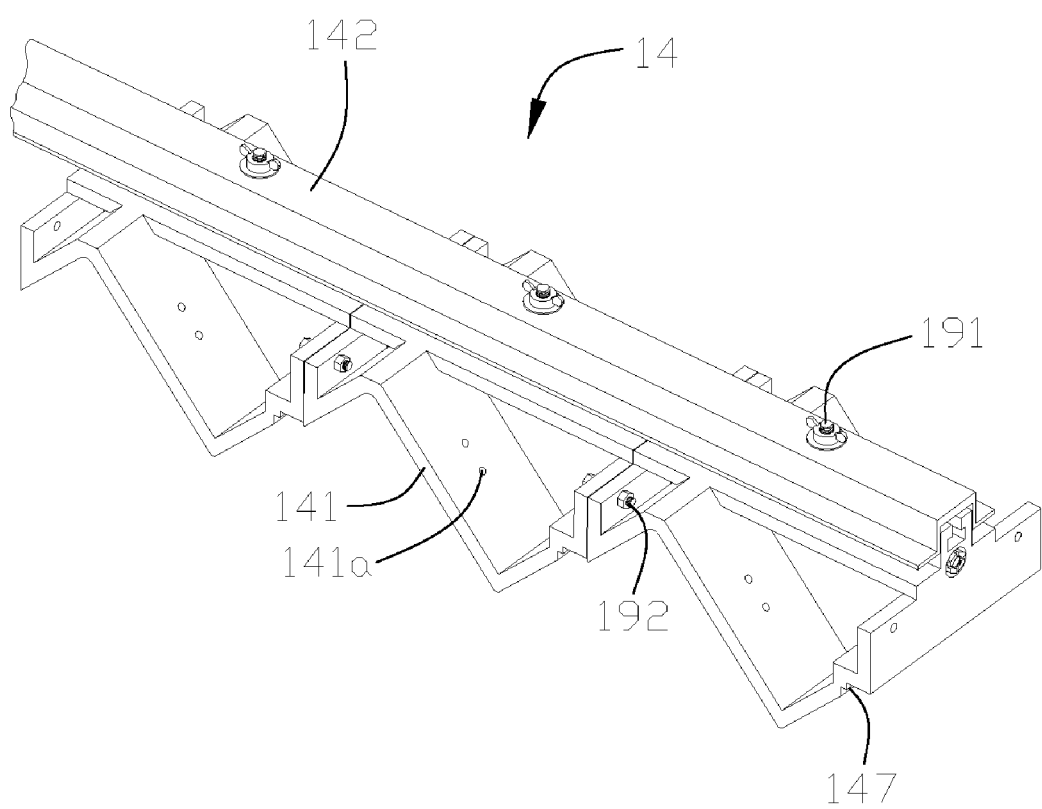
FIG. 5 is an assembled, schematic view of a connecting assembly of the solar air conditioner in FIG. 2.

Referring to FIG. 5, the connecting unit 141 has a partition plate 140 below the supporting bridge 145 and integrally connecting the supporting bridge 145 with a middle portion of the zigzag base 143. When components of the solar air conditioner are assembled, the partition plates 140 separate the heat-storage cavities 125 of the adjacent front and rear solar collectors 12 from each other. Alternatively, the partition plates 140 can also be canceled or be cut through so that the heat-storage cavities 125 of the adjacent front and rear solar collectors 12 can communicate with each other.

Figure 6:
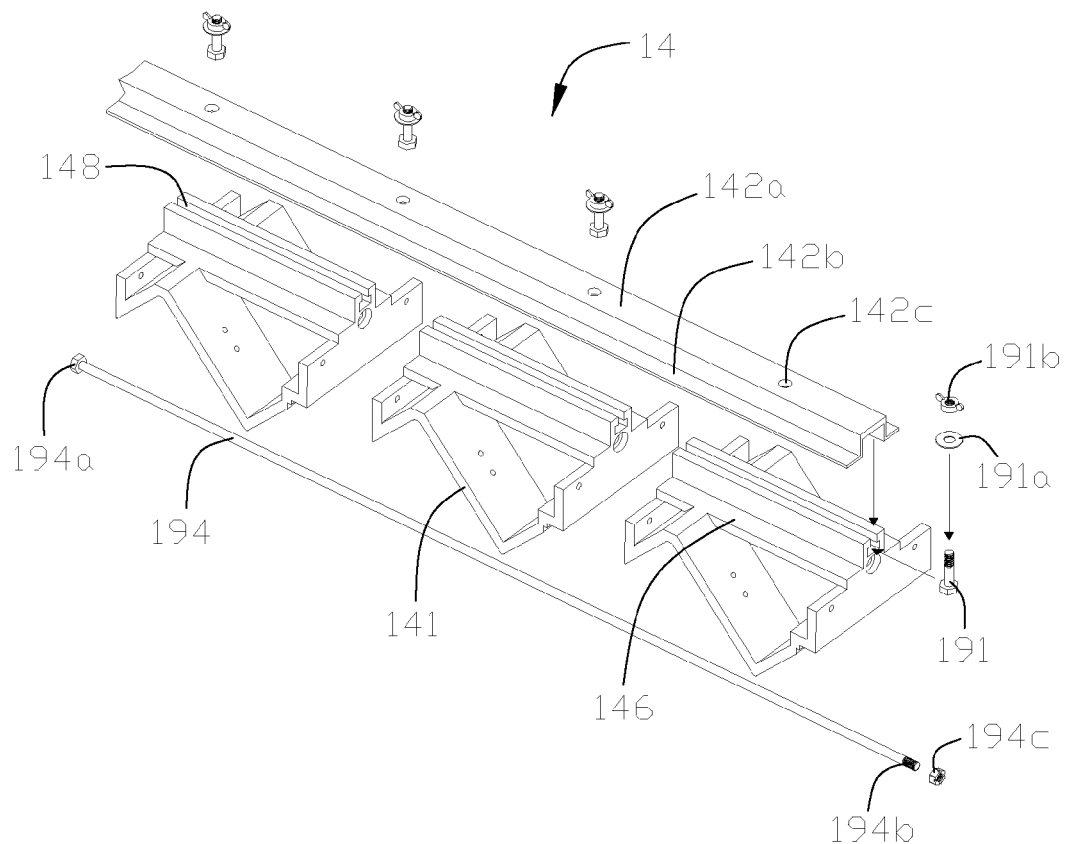
FIG. 6 is an exploded, schematic view of FIG. 5.
Figure 9:
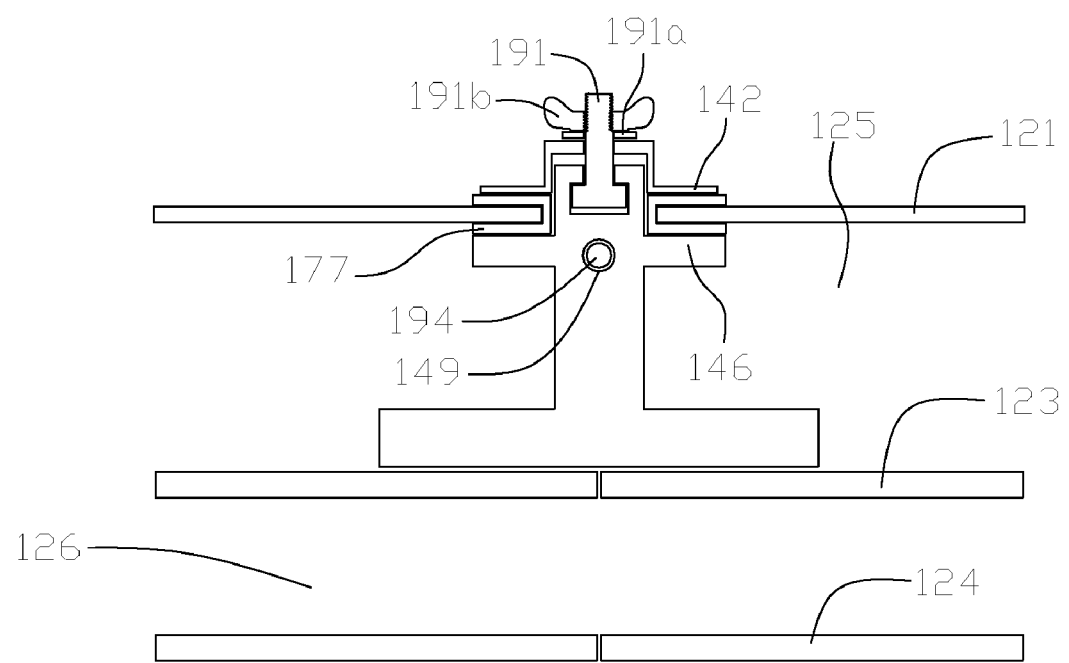
FIG. 9 is a schematic view of the solar air conditioner in FIG. 1, taken along line IX-IX.

Referring to FIGS. 5 through 7, the fixing member 142 has an n-shaped cover 142a and two flanges 142b horizontally and outwardly extending from opposite bottom ends of the cover 142a. A plurality of fixing holes 142c are discretely defined through a top surface of the cover 142a of the fixing member 142. Referring to FIG. 9, after the heat-absorbing unit 123 and the connecting units 141 are connected together, the transparent panels 121 with U-shaped cushions 177 arranged at front and rear ends thereof are placed on the top surfaces of the connecting units 141. The inverted T-shaped bolts 191 are received in the elongate grooves 148 of the connecting units 141. The fixing member 142 is placed on the supporting bridges 145 of the connecting units 141, with the T-shaped bolts 191 extending though the fixing holes 142c of the fixing member 142. A plurality of O-rings 191a are disposed around and a plurality of screw caps 191b are threaded to the T-shaped bolts 191, keeping intimate contact between the fixing member 142 and the connecting units 141. Meanwhile, the rear end of a front transparent panel 121 with the U-shaped cushion 177 and the front end of a rear transparent panel 121 with the U-shaped cushion 177 are hermetically received in two latitudinal slots (not labeled) formed between the flanges 142b of the fixing member 142 and the supporting arms 146 of the connecting units 141.

Figure 11:
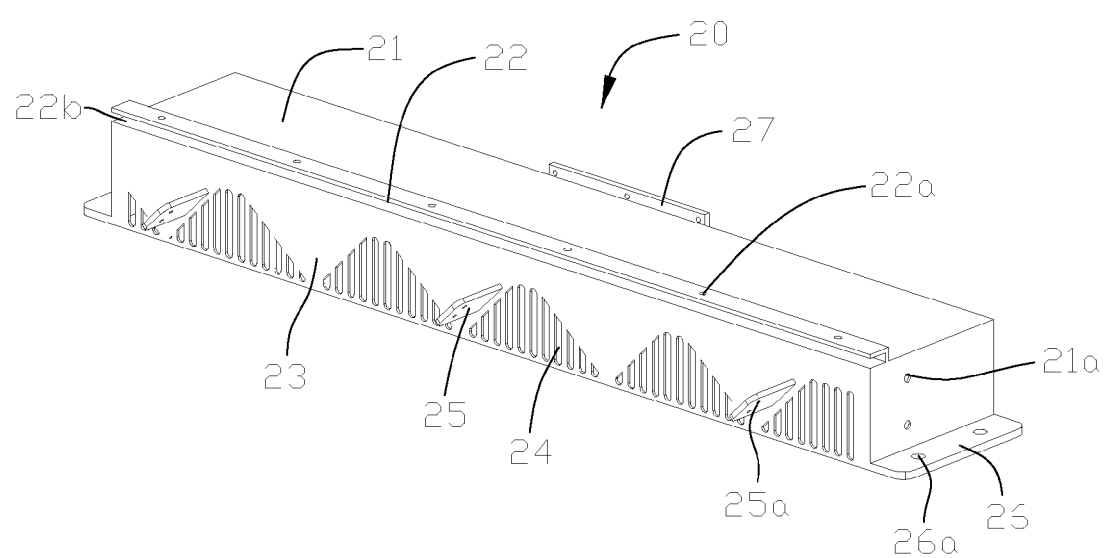
FIG. 11 is a schematic view of an inlet assembly of the solar air conditioner in FIG. 1, but viewed from different aspect.
Figure 12:
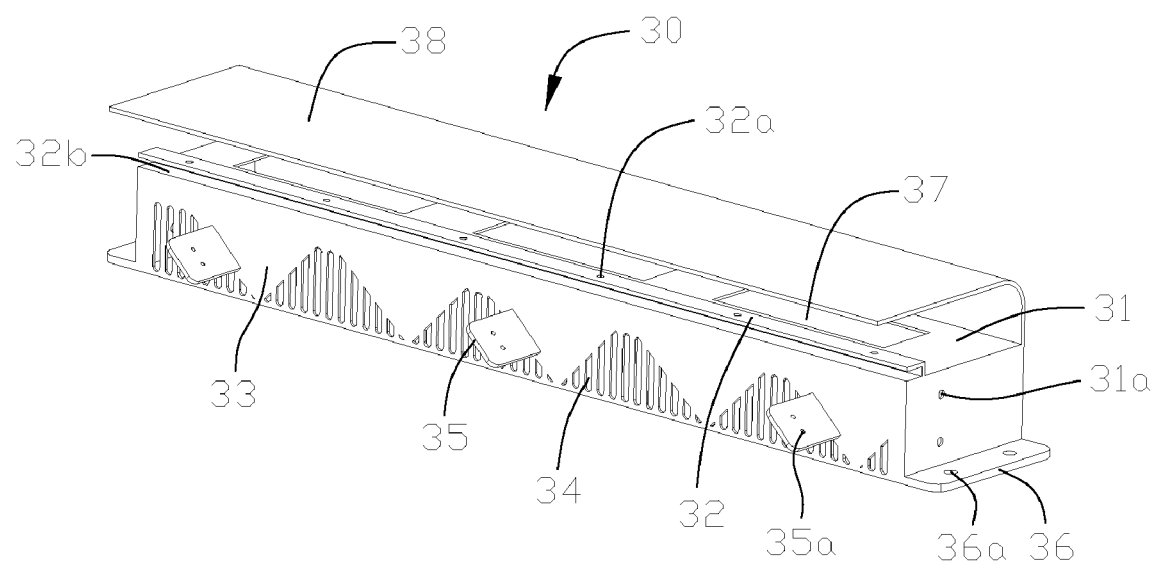
FIG. 12 is a schematic view of an outlet assembly of the solar air conditioner in FIG. 1.

Referring to FIGS. 2, 11 and 12, the inlet and outlet assemblies 20, 30 of the present solar air conditioner are shown. The inlet assembly 20 includes a hollow rectangular shaped housing 21, an L-shaped baffle 22 extending from a top surface at a position adjacent to a rear side of the housing 21. Left and right sides of the housing 21 respectively define a pair of through holes 21a therein. The through holes 21a correspond to the front though holes of the front-most two fixing members 18, for joining the inlet assembly 20 to the solar collector assembly 10. A plurality of threaded holes 22a are defined in a top surface of the baffle 22. A receiving slot 22b is formed between the top surface of the housing 21 and the baffle 22, hermetically receiving the front end of a front-most solar collector 12 therein. The housing 21 includes a rear-most spacing plate 23 which defines several groups of air passages 24 at a bottom portion thereof. The air passages 24 are separated from each other and are evenly distributed in the spacing plate 23. Three fixing plates 25 with mounting holes 25a are perpendicularly arranged on the spacing plate 23. A plurality of screws (not shown) extend through the mounting holes 25a of the fixing plates 25 of the inlet assembly 20 and the front mounting holes 141a of the front-most solar collector 12, fixing the inlet assembly 20 and the solar collector assembly 10 together. The housing 21 of the inlet assembly 20 further includes two arms 26 horizontally and outwardly extending from left and right sides thereof. The arms 26 respectively defines a pair of fixing holes 26a therein, for mounting the solar air conditioner onto the rooftop and the wall of the house, and the fixing board. The housing 21 of the inlet assembly 20 has a rectangular shaped joint 27 disposed at a middle portion of a front side thereof. The joint 27 connects the inlet assembly 20 of the solar air conditioner to the air-exhausting pipe. The outlet assembly 30 has similar housing 31, through holes 31a, baffle 32, threaded holes 32a, receiving slot 32b, spacing plate 33, air passages 34, fixing plates 35, mounting holes 35a, arms 36 and fixing holes 36a to the inlet assembly 20. The difference between the inlet assembly 20 and the outlet assembly 30 is: a top surface of the housing 31 of the outlet assembly 30 defines three spaced openings 37 therein, communicating an inner space of the outlet assembly 30 to the outdoor environments. The outlet assembly 30 has a substantially L-shaped rain cover 38 extending from a front end of a top surface of the housing so as to cover the openings 37 of the housing 32. Furthermore, a plurality of defenses (not shown) can be disposed on the housing 32, for preventing irritants and pollutants such as, dust or mosquitoes from entering into the housing. When the inlet and outlet assemblies 20, 30 are assembled to the solar collector assembly 10, top portions of the spacing plates 23, 33 of the inlet and outlet assemblies 20, 30 hermetically seal front and rear ends of the heat-storage cavity 125 of the solar collector assembly 10, whilst the air passages 24, 34 of the inlet and outlet assemblies 20, 30 communicate with the heat-absorbing cavity 126 of the solar collector assembly 10. Therefore, the stale indoor air evenly enters into the heat-absorbing cavity 126 and increases heat-absorbing efficiency of the solar air conditioner. In order to decrease air resistance, a total area of the air passages 24, 34 is preferably twice as large as a cross-sectional area of an inner hole of the air-exhausting pipe.

Figure 13:
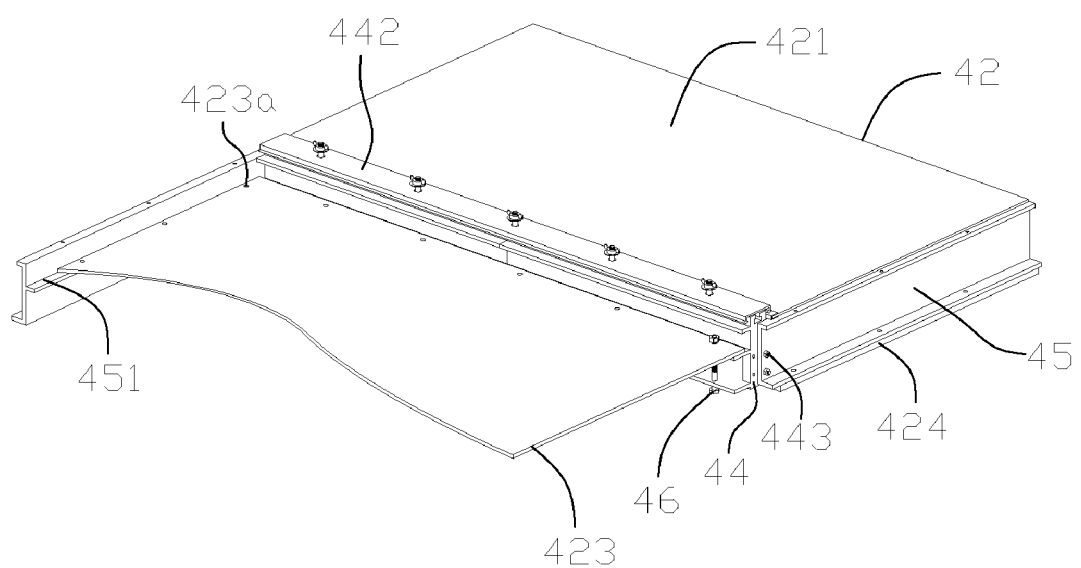
FIG. 13 is a schematic view of a solar air conditioner in accordance with a second embodiment of the present invention, with some parts thereof removed.
Figure 14:
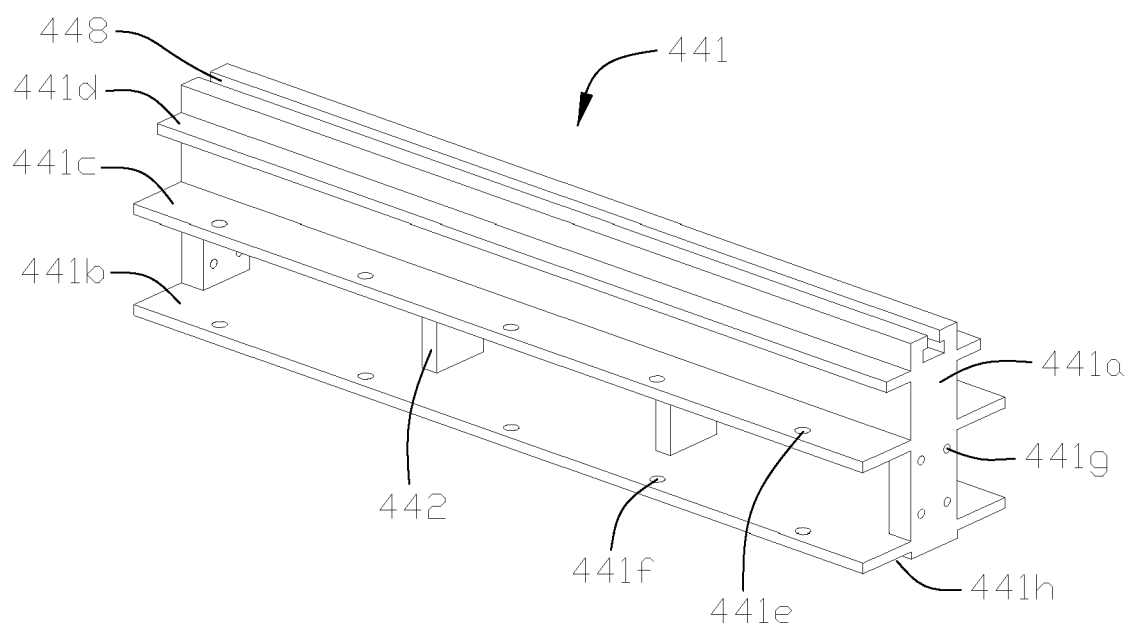
FIG. 14 is a schematic view of a connecting unit of the solar air conditioner in FIG. 13.

Referring to FIGS. 13 and 14, a second embodiment of the present solar air conditioner and a connecting unit 441 of this embodiment are shown. Differences between the second embodiment and the first embodiment are shown as below. The solar collector 42 has a planar heat-absorbing plate 423 and the connecting assembly 44 is used for joining the planar heat-absorbing plates 423 of the solar collectors 42 together. The connecting assembly 44 includes a plurality of connecting units 441 and a fixing member 442 covering the connecting units 441. The connecting unit 441 includes a vertical plate 441a, and two base plates 441b, two fixing plates 441c and two supporting wings 441d horizontally and symmetrically extending from opposite sides of a bottom portion, a middle portion and a top portion of the vertical plate 441a, respectively. A top end of the vertical plate 441a defines an inverted T-shaped elongate groove 448, which is located above the supporting wings 441d. The vertical plate 441a defines a rectangular opening between bottom surfaces of the fixing plates 441c and top surfaces of the base plates 441b. A plurality of supporting poles 442 are discretely distributed in the rectangular opening and supported between the fixing plates 441c and the base plates 441b. A length in an extension direction of the base plate 441b is greater than that of the fixing plate 441c, whilst a length in an extension direction of the fixing plate 441c is greater than that of the supporting wing 441d. Each fixing plate 441c defines a row of mounting holes 441e adjacent to an edge thereof, aligning with mounting holes 441f defined in a lower base plate 441b. The vertical plate 441a defines a plurality of fixing holes 441g at left and right sides thereof, for fixing adjacent connecting units 441 with each other via bolts 443 extending therethough.

During assembly of the connecting units 441 and the solar collectors 42, the connecting units 441 are assembled together via the bolts 443 extending through the fixing holes 441g of the adjacent connecting units 441, and the connecting assembly 44 is therefore obtained. The fixing holes 441g at left and right sides of the connecting assembly 44 is used for extending the bolts 443 therethrough so as to join the connecting assembly 44 with left and right supporting members 45. The supporting members 45 each extend an elongate protrusion 451 from a middle portion thereof. The elongate protrusion 451 defines a plurality of mounting holes (not labeled) therein, which align with mounting holes (not labeled) defined in left and right sides of the heat-absorbing plate 423. The bottom plates 424 of the front and rear solar collectors 42 are placed under the base plates 441b and received in notches 441h formed below the base plates 441b. The planar heat-absorbing plates 423 of the front and rear solar collectors 42 are placed on the fixing plates 441c. A plurality of bolts 46 extend through the mounting holes 441e, 441f of the connecting assembly 44, and mounting holes 423a of the heat-absorbing plates 423 and the bottom plates 424. The heat-absorbing plates 423 and the bottom plates 424 of the front and rear solar collectors 42 and the connecting assembly 44 are assembled together. The transparent panels 421 of the front and rear solar collectors 42 are placed on the supporting wings 441d of the connecting assembly 44, and are fixed to the connecting assembly 44 and the supporting members 45 in a same manner as the first embodiment. Additionally, a plurality of supporting poles (not shown) can be arranged between for strengthening connections between the bottom plates 424 and the heat-absorbing plates 423.

In summer, the solar air conditioner can heat the stale indoor air guided from the air-exhausting pipe and expel the heated stale indoor air out of the housing using thermal buoyancy effect. At the same time, cool and fresh outdoor air can be guided into the house, or the outdoor air can be cooled and guided into the house through other devices (not shown) or channels (not shown). Thus, in summer, air in the house can be kept fresh and cool all the time.

In winter, air through the air-exhausting pipe can be heated in the solar collector assembly 10 of the solar air conditioner and guided back to the house via a fan (not shown) connected with the air-exhausting pipe. Furthermore, when the fresh outdoor air is guided to mix with air in the air-exhausting pipe and further heated in the solar collector assembly 10, the inlet assembly 20 should communicate with the air-exhausting pipe and air openings of the casing should be opened. The fan draws the fresh outdoor air through the solar air conditioner to the house.

The solar air conditioner can be installed with a hot water supply system (not shown) which can operate year-round. A plurality of heat-absorbing water pipes (not shown) are arranged in the heat-storage cavities 125 of the solar air conditioner, then heated water is transferred back to a water circulation circuit (not shown) including a heat storage tank (not shown). Meanwhile, air is heated in the heat-absorbing channels 126a of the solar air conditioner.

The solar air conditioner continuously induces the stale indoor air to evenly enter into the heat-absorbing channels 126a of the heat-absorbing cavity 126 through the inlet assembly 20. The stale indoor air is heated in the heat-absorbing cavity 126 and is exhausted out of the housing under thermal buoyancy effect. Meanwhile, the fresh outdoor air is induced into the housing. The solar air conditioning device is therefore good for health, for energy saving and for environmental protection.

In the present solar air conditioner, the heat-absorbing unit 123 of the solar collectors 12 are joined to the solar collector assembly 10 via the connecting assemblies 14. Therefore, the solar air conditioner can be flexibly expanded as desired to most optimal absorption surface area to fully absorb and collect solar energy, which strengthens the thermal buoyancy effect of the solar air conditioner. Air circulation in the solar air conditioner is therefore improved due to the strengthened thermal buoyancy effect. Furthermore, the heat-absorbing plates 123a, the connecting plates and other individual components of the solar air conditioner can be separately assembled together, which simplifies the assembly and further decreases the assembly cost of the solar air conditioner. In addition, the solar collector assembly 10 can be divided into many pieces, which can be individually repaired. Thus, the reparation of the solar air conditioner is simplified and the reparation cost of the solar air conditioner is decreased.

One special feature of the solar air conditioning device is that although it only has one layer of transparent panel 121 in its structure, because most air goes through the lower heat-absorbing cavity 126, the solar air conditioner has the excellent insulation effect of a double-glazed system and very high heat-absorption efficiency.

The solar air conditioning device is designed according to a modular concept. Cost of the solar air conditioning device is greatly reduced because the components are made of thin boards and plates, and are suitable for mass-production. The solar air conditioning device is much simpler than related assemblies with whole-unit designs. The assembly not only saves expenses in packaging but also requires less room for display and storage to make channel marketing much easier. The solar air conditioning device is very easy to install and maintain such a system. Moreover, users can install and assemble the system by themselves.

All in all, the solar air conditioner is a passive environmental protection air conditioner which is driven by solar energy. There is no need to consume electric energy and no environmental destroy caused by refrigerant. The solar air conditioner exhausts the stale indoor air out of the house and induces the fresh outdoor air into the house. Therefore, the quality of the indoor air is improved and a comfortable feeling is obtained. Moreover, the modularized components benefit the solar air conditioner for being displayed, packaged, stored, transported and assembled. Furthermore, the components of the solar air conditioner are thin and are handy for DIY assembly, which fits for the environmental protection and DIY trends.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solar air conditioner comprising:
    an inlet assembly;
    an outlet assembly;
    a solar collector assembly disposed between the inlet assembly and the outlet assembly, the solar collector assembly comprising a plurality of solar collectors each of which comprises a bottom plate, a heat-absorbing unit mounted on the bottom plate, and a transparent panel positioned on the heat-absorbing unit, the heat-absorbing unit dividing an inner space of the solar collector into an upper heat-storage cavity and a lower heat-absorbing cavity, the inlet assembly sealing one end of the upper heat-storage cavity closed and communicating with one end of the lower heat-absorbing cavity of one of the solar collectors, and the outlet assembly sealing one end of the upper heat-storage cavity closed and communicating with one end of the lower heat-absorbing cavity of another one of the solar collectors; and
    a plurality of connecting assemblies connecting the solar collectors together, the inlet assembly and said one of the solar collectors together, and the outlet assembly and said another one of the solar collectors together;

wherein each of the connecting assemblies comprises a plurality of connecting units, the connecting units being disposed between adjacent solar collectors, the inlet assembly and said one of the solar collectors, and the outlet assembly and said another one of the solar collectors, thereby joining the inlet assembly, the outlet assembly and the solar collectors together; and wherein each of the connecting units comprises a zigzag base and two joining plates extending from the zigzag base, the connecting units being united together via connections between the joining plates.

2. The solar air conditioner as claimed in claim 1, wherein the heat-absorbing unit comprises a plurality of S-shaped heat-absorbing plates, the heat-absorbing plates engaging with each other via first and second clasping structures formed at opposite ends thereof.

3. The solar air conditioner as claimed in claim 2, wherein each of the first clasping structures defines a C-shaped cutout, and each of the second clasping structures is a clasping protrusion fitted in a corresponding one of the cutouts except in the case of an endmost one of the heat-absorbing plates.

4. The solar air conditioner as claimed in claim 2, wherein each of the solar collectors further comprises first and second supporting members at opposite sides thereof, the first supporting member having a first clasping structure engaged with the second clasping structure of an adjacent heat-absorbing plate except in the case of an endmost one of the solar collectors, and the second supporting member having a second clasping structure engaged with the first clasping structure of an adjacent heat-absorbing plate except in the case of an endmost one of the solar collectors.

5. The solar air conditioner as claimed in claim 4, wherein the first and second supporting members respectively have a bottom base connected with the bottom plate of the solar collector, and a supporting base connected with a lower plate of a supporting element, the transparent panel being sandwiched between an upper plate of the supporting element and the supporting base.

6. The solar air conditioner as claimed in claim 4, further comprising a plurality of fixing assemblies each of which comprises two ears, the ears of the fixing assemblies being respectively fixed to adjacent solar collectors, the inlet assembly and said one of the solar collectors, and the outlet assembly and said another one of the solar collectors, thereby joining the inlet assembly, the outlet assembly and the solar collectors together.

7. The solar air conditioner as claimed in claim 1, wherein each of the connecting units further comprises a supporting bridge spanning above the zigzag base and the joining plates, the supporting bridge defining an inverted T-shaped groove therein, each connecting assembly further comprising a fixing member covering the connecting units, a plurality of inverted T-shaped joining elements being snapped in the inverted T-shaped grooves and extending through the fixing member so as to mount the fixing member onto the connecting units.

8. The solar air conditioner as claimed in claim 7, wherein the supporting bridge defines a through slot below the inverted T-shaped groove, an elongate bolt extending through the through slots and joining the connecting units together.

9. The solar air conditioner as claimed in claim 8, wherein the elongate bolt has a hexagonal fixing cap at one end and threads at the other end, the through slot of one of the connecting units having a hexagonal counter-bore at one end thereof receiving the fixing cap, and the through slot of another one of the connecting units having a round counter-bore at one end thereof receiving the screw cap.

* * * * *